US009348429B2

(12) United States Patent
Pasquero et al.

(10) Patent No.: US 9,348,429 B2
(45) Date of Patent: May 24, 2016

(54) METHOD AND APPARATUS FOR WORD PREDICTION USING THE POSITION OF A NON-TYPING DIGIT

(71) Applicant: Research In Motion Limited, Waterloo (CA)

(72) Inventors: Jerome Pasquero, Montreal (CA); Donald Somerset McCulloch McKenzie, Waterloo (CA)

(73) Assignee: BlackBerry Limited, Waterloo, Ontario (CA)

( * ) Notice: Subject to any disclaimer, the term of this patent is extended or adjusted under 35 U.S.C. 154(b) by 20 days.

(21) Appl. No.: 13/833,303

(22) Filed: Mar. 15, 2013

(65) Prior Publication Data

US 2014/0267056 A1 Sep. 18, 2014

(51) Int. Cl.
*G06F 3/023* (2006.01)
*G06F 3/0488* (2013.01)

(52) U.S. Cl.
CPC ............ *G06F 3/0237* (2013.01); *G06F 3/0488* (2013.01)

(58) Field of Classification Search
None
See application file for complete search history.

(56) References Cited

U.S. PATENT DOCUMENTS

| | | | |
|---|---|---|---|
| 6,204,839 B1 | 3/2001 | Mato, Jr. | |
| 2003/0165801 A1* | 9/2003 | Levy | 434/227 |
| 2004/0021633 A1* | 2/2004 | Rajkowski | 345/156 |
| 2004/0156562 A1* | 8/2004 | Mulvey et al. | 382/310 |
| 2005/0052406 A1* | 3/2005 | Stephanick et al. | 345/156 |
| 2006/0161870 A1* | 7/2006 | Hotelling et al. | 715/863 |
| 2006/0244727 A1* | 11/2006 | Salman et al. | 345/168 |
| 2007/0040813 A1* | 2/2007 | Kushler | G06F 3/0237 345/173 |
| 2007/0046641 A1* | 3/2007 | Lim | 345/173 |
| 2008/0281583 A1 | 11/2008 | Slothouber et al. | |
| 2009/0007001 A1 | 1/2009 | Morin et al. | |
| 2009/0195506 A1* | 8/2009 | Geidl et al. | 345/168 |
| 2010/0225599 A1* | 9/2010 | Danielsson et al. | 345/173 |
| 2010/0292984 A1 | 11/2010 | Huang et al. | |
| 2011/0010655 A1 | 1/2011 | Dostie et al. | |
| 2011/0201387 A1* | 8/2011 | Paek et al. | 455/566 |
| 2011/0285555 A1 | 11/2011 | Bocirnea | |
| 2012/0092278 A1 | 4/2012 | Yamano | |
| 2012/0119997 A1 | 5/2012 | Gutowitz | |

(Continued)

FOREIGN PATENT DOCUMENTS

EP 1975808 A1 10/2008
WO WO2012076742 A1 6/2012

OTHER PUBLICATIONS

Extended European Search Report from the European Patent Office for corresponding EP Application No. 13159374.1, dated Aug. 2, 2013 (8 pages).

*Primary Examiner* — Claire X Pappas
*Assistant Examiner* — Benjamin Casarez
(74) *Attorney, Agent, or Firm* — Fish & Richardson P.C.

(57) ABSTRACT

Methods and apparatuses are provided for improving word prediction in an electronic device. User input of one or more characters is received via a capacitive physical keyboard having a plurality of input members. Concurrently, the device determines the location of a non-typing digit, such as the user's finger or a stylus. Word prediction candidates are generated and weighted, and candidates that have subsequent characters associated with the input member proximal to the location of the non-typing digit are given more weight. The word prediction candidates are displayed, a second user input is then received comprising a selection of one of the candidates, and the device displays the selected word prediction candidate on the display.

18 Claims, 6 Drawing Sheets

(56) References Cited

U.S. PATENT DOCUMENTS

2012/0223889 A1 9/2012 Medlock et al.
2012/0260207 A1* 10/2012 Treskunov et al. ........... 715/773
2013/0038537 A1* 2/2013 Nishii ................... G06F 17/276
 345/168
2013/0046544 A1* 2/2013 Kay .................... G06F 3/04883
 704/275
2014/0062875 A1* 3/2014 Rafey et al. ................... 345/158
2014/0098023 A1 4/2014 Zhai
2014/0115522 A1* 4/2014 Kataoka .................. G06F 3/017
 715/773

* cited by examiner

Scenario: Baseline
Right thumb has entered "N" + "O"
| Candidate | Weight |
|---|---|
| north | 80 |
| none | 60 |
| nothing | 50 |
| note | 25 |
| noise | 20 |
FIG. 5A
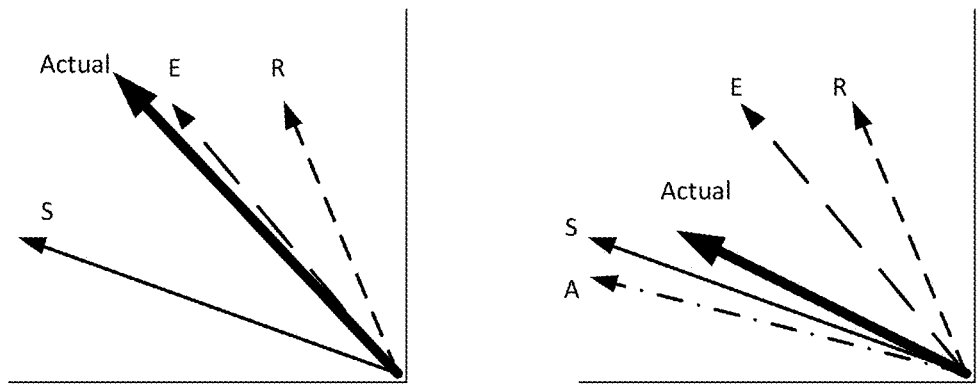
FIG. 5B
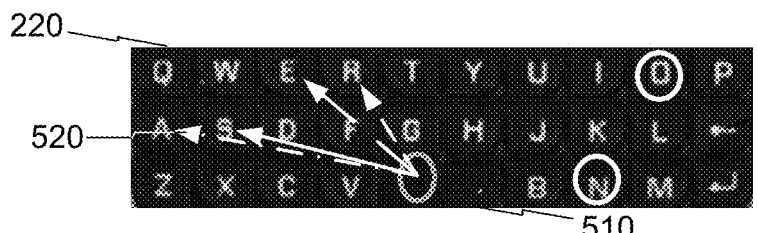
FIG. 5C     FIG. 5E
Scenario: 5C
Right thumb has entered "N" + "O"
Left thumb probabilities:
E: 60%, R: 10%, S: 5%
| Candidate | Weight |
|---|---|
| none | 96 |
| north | 88 |
| nothing | 50 |
| note | 25 |
| noise | 21 |
FIG. 5D
Scenario: 5E
Right thumb has entered "N" + "O"
Left thumb probabilities:
S: 50%, E: 10%, A: 20%
| Candidate | Weight |
|---|---|
| north | 80 |
| none | 66 |
| nothing | 50 |
| noise | 30 |
| note | 21 |
FIG. 5F

METHOD AND APPARATUS FOR WORD PREDICTION USING THE POSITION OF A NON-TYPING DIGIT

FIELD

This application generally relates to input methodologies for electronic devices, such as handheld electronic devices, and more particularly, to methods for enhancing word prediction algorithms using positional data associated with the location of a non-typing, or idle, digit of a user on a keyboard.

BACKGROUND

Advances in technology permit electronic devices, such as computers, netbooks, cellular phones, smart phones, personal digital assistants, tablets, etc., to process text input increasingly quickly and on increasingly smaller devices and keyboards. Examples include word prediction and disambiguation algorithms configured to suggest or recommend during the input process and, in some instances before the process is completed, words that users are trying to input. These functions increase both data entry speed and accuracy. Many users now demand and depend on these features. Nevertheless, further optimization of word prediction and textual entry is required for rapid entry of words.

BRIEF DESCRIPTION OF THE DRAWINGS

FIGS. 5A-5G are diagrams further illustrating the word prediction process, consistent with embodiments disclosed herein.

DETAILED DESCRIPTION

Figure 1:
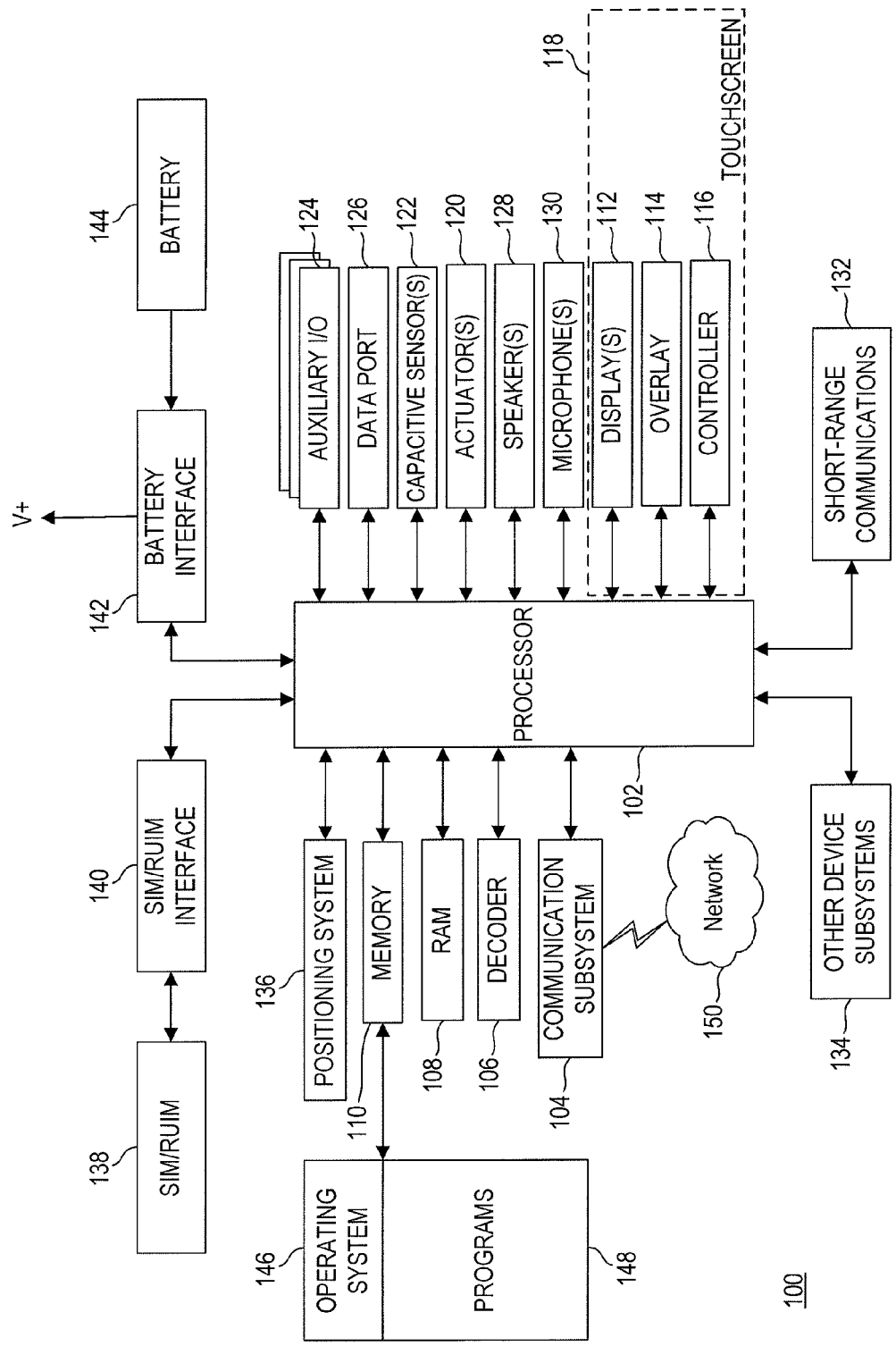
FIG. 1 is an example block diagram of an electronic device, consistent with embodiments disclosed herein.

Reference will now be made in detail to the disclosed example embodiments, examples of which are illustrated in the accompanying drawings. Wherever possible, the same reference numbers will be used throughout the drawings to refer to the same or like parts.

Use of the indefinite article "a" or "an" in the specification and the claims is meant to include one or more than one of the feature that it introduces, unless otherwise indicated. Thus, the term "a set of characters" as used in "generating a set of characters" can include the generation of one or more than one set of characters. Similarly, use of the definite article "the," or "said," particularly after a feature has been introduced with the indefinite article, is meant to include one or more than one of the feature to which it refers (unless otherwise indicated). For example, the term "the generated set of characters" as used in "displaying the generated set of characters" includes displaying one or more generated set of characters. Directional references to graphical user interface (GUI) elements, such as top and bottom, are intended to be relative to a current screen orientation (which may be changed) rather than any physical orientation of the host device.

Methods and apparatuses are provided to increase the speed of word entry by incorporating positional data associated with the location of the idle thumb on the keyboard during text entry by enhancing word prediction algorithms.

In one embodiment, a method is disclosed for operating an electronic device having a display and a keyboard having a plurality of input members for receiving inputs. The method includes receiving an input of one or more characters by a first typing digit. Additionally, the method includes detecting a position of a non-typing digit that is different from the typing digit, and generating a set of word prediction candidates based on the input and the detected position of the non-typing digit. The method further includes weighting the word prediction candidates in the set, and adjusting weights for word prediction candidates with subsequent characters corresponding to input members proximal to the detected position of the non-typing digit. Further, the method includes displaying select ones of the word prediction candidates.

In another embodiment, an electronic device having a display and a keyboard having a plurality of input members for receiving inputs is disclosed. The device further comprises a memory containing instructions, and one or more processors configured to execute the instructions. The one or more processors are configured to execute the instructions to receive an input of one or more characters by a first typing digit. Additionally, the one or more processors are configured to detect a position of a non-typing digit that is different from the typing digit, and generate a set of word prediction candidates based on the input and the detected position of the non-typing digit. The one or more processors are configured to weight the word prediction candidates in the set, and adjust weights for word prediction candidates with subsequent characters corresponding to input members proximal to the detected position of the non-typing digit. Further, the one or more processors are configured to display select ones of the word prediction candidates.

FIG. 1 is a block diagram of an electronic device 100, consistent with example embodiments disclosed herein. Electronic device 100 includes multiple components, such as a main processor 102 that controls the overall operation of electronic device 100. Communication functions, including data and voice communications, are performed through a communication subsystem 104. Data received by electronic device 100 is decompressed and decrypted by a decoder 106. The communication subsystem 104 receives messages from and sends messages to a network 150. Network 150 can be any type of network, including, but not limited to, a wired network, a data wireless network, voice wireless network, and dual-mode wireless networks that support both voice and data communications over the same physical base stations. Electronic device 100 can be a battery-powered device and include a battery interface 142 for receiving one or more batteries 144.

Main processor 102 is coupled to and can interact with additional subsystems such as a Random Access Memory (RAM) 108; a memory 110, such as a hard drive, CD, DVD, flash memory, or a similar storage device; one or more actuators 120; one or more capacitive sensors 122; an auxiliary input/output (I/O) subsystem 124; a data port 126; a speaker 128; a microphone 130; short-range communications 132; other device subsystems 134; and a touchscreen 118.

Touchscreen 118 includes a display 112 with a touch-active overlay 114 connected to a controller 116. User-interaction with a graphical user interface (GUI), such as a virtual keyboard rendered on the display 112 as a GUI for input of characters, or a web-browser, is performed through touch-active overlay 114. Main processor 102 interacts with touch-active overlay 114 via controller 116. Characters, such as text, symbols, images, and other items are displayed on display 112 of touchscreen 118 via main processor 102. Characters are input when, for example, a user touches the touchscreen at a location associated with said character.

Touchscreen 118 is connected to and controlled by main processor 102. Accordingly, detection of a touch event and/or determining the location of the touch event can be performed by main processor 102 of electronic device 100. A touch event includes in some embodiments, a tap by a digit, such as a finger, a swipe by a digit, a swipe by a stylus, a long press by a digit or a stylus, or a press by a digit for a predetermined period of time, and the like.

While specific embodiments of a touchscreen are described, any suitable type of touchscreen for an electronic device can be used, including, but not limited to, a capacitive touchscreen, a resistive touchscreen, a surface acoustic wave (SAW) touchscreen, an embedded photo cell touchscreen, an infrared (IR) touchscreen, a strain gauge-based touchscreen, an optical imaging touchscreen, a dispersive signal technology touchscreen, an acoustic pulse recognition touchscreen or a frustrated total internal reflection touchscreen. The type of touchscreen technology used in any given embodiment will depend on the electronic device and its particular application and demands.

Main processor 102 can also interact with a positioning system 136 for determining the location of electronic device 100. The location can be determined in any number of ways, such as by a computer, by a Global Positioning System (GPS), either included or not included in electric device 100, through a Wi-Fi network, or by having a location entered manually. The location can also be determined based on calendar entries.

In some embodiments, to identify a subscriber for network access, electronic device 100 uses a Subscriber Identity Module or a Removable User Identity Module (SIM/RUIM) card 138 inserted into a SIM/RUIM interface 140 for communication with a network, such as network 150. Alternatively, user identification information can be programmed into memory 110.

Electronic device 100 also includes an operating system 146 and programs 148 that are executed by main processor 102 and are typically stored in memory 110. Additional applications may be loaded onto electronic device 100 through network 150, auxiliary I/O subsystem 124, data port 126, short-range communications subsystem 132, or any other suitable subsystem.

A received signal such as a text message, an e-mail message, an instant message, or a web page download is processed by communication subsystem 104 and this processed information is then provided to main processor 102. Main processor 102 processes the received signal for output to display 112, to auxiliary I/O subsystem 124, or a combination of both. A user can compose data items, for example e-mail messages, which can be transmitted over network 150 through communication subsystem 104. For voice communications, the overall operation of electronic device 100 is similar. Speaker 128 outputs audible information converted from electrical signals, and microphone 130 converts audible information into electrical signals for processing.

Figure 2A:
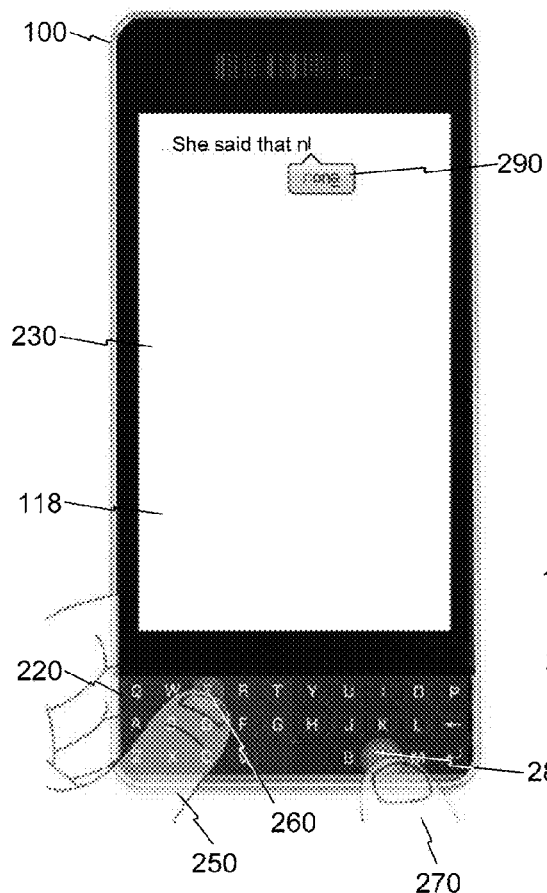
FIGS. 2A-2B show examples of an electronic device, consistent with embodiments disclosed herein.
Figure 2B:
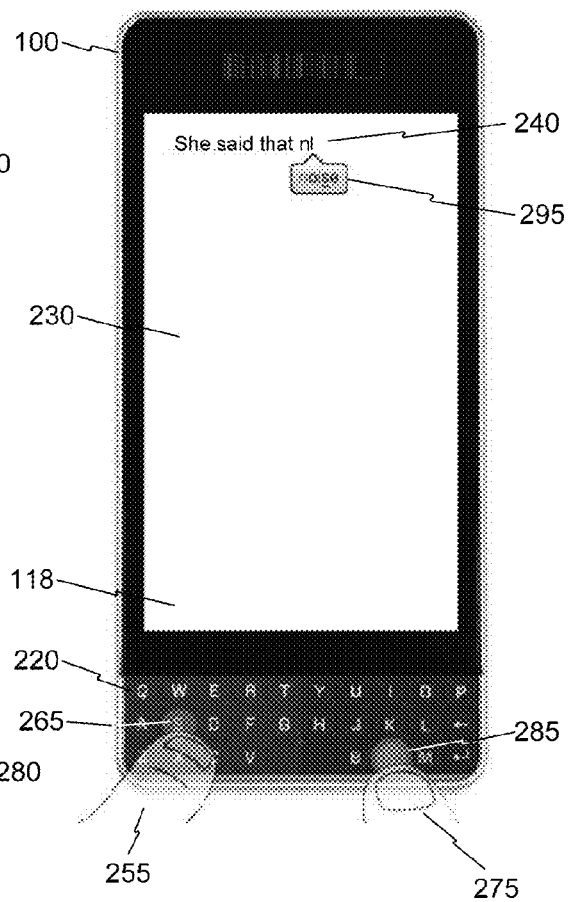

FIGS. 2A-2B illustrate examples of electronic device 100. FIG. 2A illustrates a touchscreen 118 and a keyboard 220. In some embodiments, keyboard 220 is a capacitive physical keyboard, comprising a series of input members comprising key covers overlaid on top of physical or electronic dome switches. Further, the capacitive physical keyboard contains actuators 120 and capacitive sensors 122 that permit both tactile input via depression of the key covers on top of the actuators 120 and gesture input via capacitive sensors 122.

The input resolution of keyboard 220 is at least to the level of a single input member; in other words, responsive to an input received via keyboard 220, processor 102 is capable of detecting which one of the plurality of input members of keyboard 220 was contacted. In some embodiments, an input received via keyboard 220 can be localized to precise coordinates in the X and Y directions on the keyboard via capacitive sensors 122. Alternatively, keyboard 220 may be a virtual keyboard displayed on touchscreen 118. In some embodiments, keyboard 220 can additionally sense the position of a digit hovering proximal to one or more input members of the keyboard, such as a thumb or finger of a user, or a stylus. Hovering digits may be sensed by capacitive sensors 122.

As used herein, a "key press" input received by keyboard 220 means a depression of one of the plurality of input members associated with one of the actuators 120 to an extent that is sufficient to engage the physical or electronic dome switch associated with that key. In contrast, a "tap" input received by keyboard 220 means a touch input of one of the plurality of input members associated with one of the actuators 120 for a duration less than or equal to about 0.5 seconds which does not engage the physical or electronic dome switch associated with that input member. In some embodiments, keyboard 220 may be configured in a manner such that the duration of a tap input may be more than 0.5 seconds. In alternative embodiments, keyboard 220 may be configured in a manner such that the duration of a tap input may be more than 0.5 seconds. The input may be registered by one or more capacitive sensors 122. Alternatively, in some embodiments keyboard 220 may be a virtual keyboard implemented with touchscreen 118, which, like a capacitive physical keyboard, is programmable to distinguish between different types of touch events like the key press and tap inputs described above. For example, the virtual keyboard may distinguish these types of events based on pressure sensed on touchscreen 118, or by measuring the duration of a touch event.

The position of the keyboard 220 is variable relative to touchscreen 118. The touchscreen 118 can be configured to detect the location and possibly pressure of one or more objects at the same time. The touchscreen 118 includes two input areas: (1) the keyboard 220, which includes a plurality of input members, each input member corresponding to one or more different characters of a plurality of characters; and (2) a viewing pane 230 which displays a predetermined amount of text from a document under composition. In the example, the keyboard 220 is located below the viewing pane 230. Other locations for the input areas 220 and 230 are possible. For example, the keyboard 220 could be located at the top of the touchscreen 118, and the viewing pane 230 could be located below the keyboard 220. In yet other examples, the viewing pane 230 could be omitted.

The amount of text in viewing pane 230 from the document under composition may be limited to a predetermined number of lines of text, for example, 10 lines. The document under composition may be any type of document for any application which supports the keyboard 220, such as an email or other messaging application.

As shown in FIG. 2A, keyboard 220 is a standard QWERTY keyboard layout; however, any keyboard layout can be displayed for use in the device, such as AZERTY, QWERTZ, or a layout based on the International Telecommunication Union (ITU) standard (ITU E.161) having "ABC" on key 2, "DEF" on key 3, and so on. Keyboard 220 includes various input members that can provide different inputs, such as punctuation, letters, numbers, enter or return keys, and function keys. While keyboard 220 is shown as having a square shape, it can have any other shape (such as an oval).

As shown in FIG. 2A, electronic device 100 receives text input from keyboard 220. In this example, the device receives entry of the character "n," via key press input 280 by right thumb 270 and outputs it to the left of cursor 240 within viewing pane 230. Concurrently with the input of "n," device 100 and the capacitive sensors 122 of keyboard 220 monitor the position of the non-typing, or idle, digit. As used herein, "idle" or "non-typing" means active on keyboard 220, but not operationally engaged. Conversely, the "typing" digit is both active on keyboard 220 and operationally engaged.

In FIG. 2A, the non-typing digit is left thumb 250. Although in this example both digits are thumbs, in this case left thumb 250 and right thumb 270, various digits may be used, such as thumbs and fingers. In some embodiments, a stylus may alternatively be used. Keyboard 220 senses that left thumb 250 is resting on "e" key 260. This non-typing digit position data is used by device 100 to generate and display word prediction candidates using a word prediction algorithm. In some embodiments, the non-typing digit may be merely hovering over keyboard 220 and not actually in contact with the input members, and its position may be sensed through capacitive sensing methods by capacitive sensors 122. The candidate or candidates are presented in candidate ribbon 290 proximal to cursor 240 within viewing pane 230. In other embodiments, word prediction candidates may be displayed in other locations on viewing pane 230 and in different formats.

In some embodiments, keyboard 220 may be effectively "divided" by processor 102 for purposes of word prediction candidate generation. Word prediction candidates may be generated and displayed by these methods based on words that begin with the characters input by the typing digit. In the example illustrated in FIG. 2A, right thumb 270 has entered character "n," which in a QWERTY keyboard layout is located on the right side of keyboard 220. Prediction candidates are then generated based on subsequent characters that are located on the left side of keyboard 220 near the position of idle left thumb 250. For example, in FIG. 2A, within candidate ribbon 290, the prediction candidate "none" is presented based on context of the sentence being typed and the position of left thumb 250. In some embodiments, the character or characters associated with the non-typing digit position data may be displayed by device 100 with distinguishing visual indicia to indicate to the user a shortcut for selecting that particular candidate. In FIG. 2A, the character "e," associated with input member 260, is underlined. In other embodiments, device 100 may provide other visual indicia for the "non-typing digit" character, such as displaying the character in a different color, displaying the character in a different font, displaying the character in a different size font, etc.

In FIG. 2B keyboard 220 receives input of the character "n" from right thumb 275 on input member 285, and displays the character to the left of cursor 240. In this example, left thumb 255 is resting on input member 265, which corresponds to the letter "s." Based on this position information, the prediction candidate "noise" is displayed in candidate ribbon 295. In FIG. 2B the character "s" corresponding to the position of the non-typing digit is displayed as underlined in candidate ribbon 295 to signal to the user an input member that can be pressed to quickly select the prediction candidate.

Electronic device 100 may generate and select for display word prediction candidates based on various criteria and methods. In some embodiments, word prediction candidates may be drawn from a dictionary stored within device 100, for example, in memory 110. In other embodiments, candidates may be weighted based on various factors. The factors may include, but are not limited to, rate of previous usage by the user, context from other inputted words received, geographical location of the user, etc. In some embodiments, candidates may be weighted based on prior determinations of the input member that was eventually input when the non-typing digit was in a particular starting position.

Figure 3A:
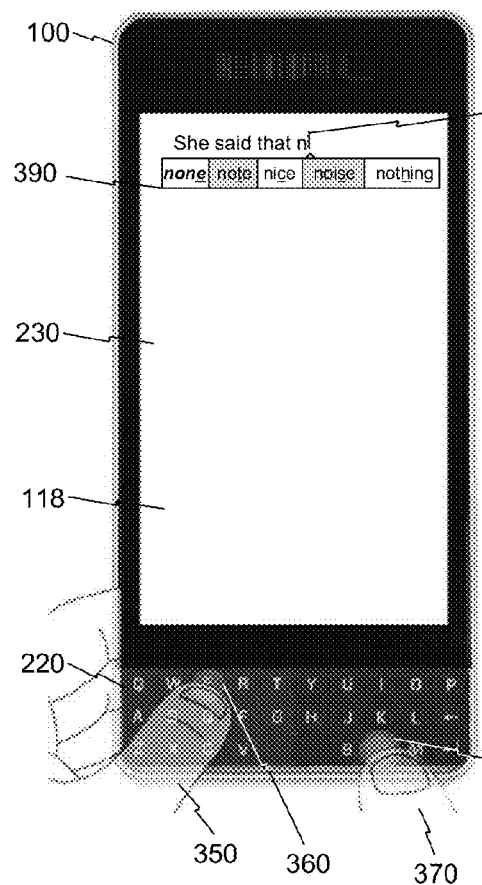
FIGS. 3A-3B show further examples of an electronic device, consistent with embodiments disclosed herein.
Figure 3B:
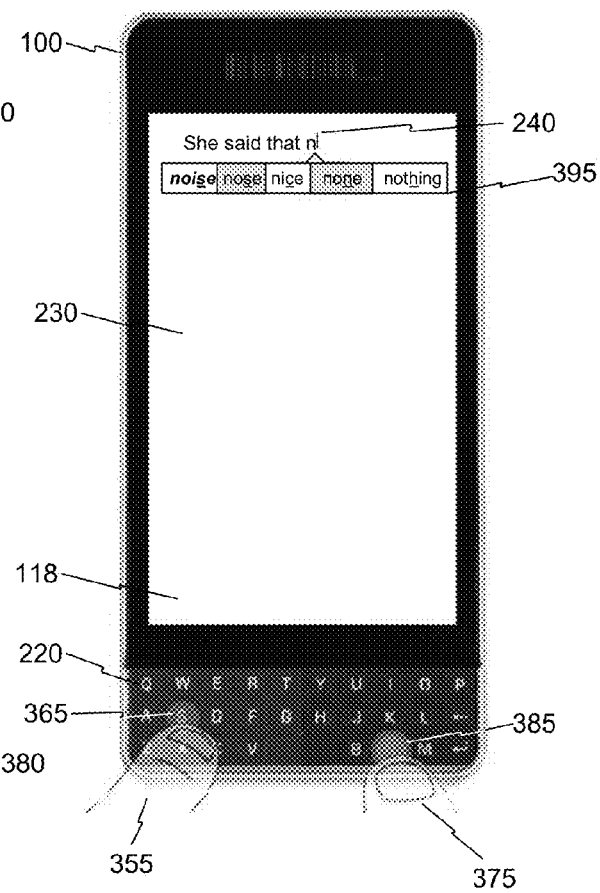

FIGS. 3A-3B illustrate further examples of electronic device 100. In the example illustrated in FIG. 3A, right thumb 370 has entered character "n." Prediction candidates are then generated based on subsequent characters that are located on the keyboard 220 near the position of idle left thumb 350. In candidate ribbon 390, multiple word prediction candidates are displayed. In some embodiments, the display order of the word prediction candidates within candidate ribbon 390 may be altered based on various criteria; for example, device 100 may give more weight to candidates whose next or subsequent character input member is proximal to the detected position of the non-typing digit. As an example, in FIG. 3A, the candidates are displayed from left to right based on context and the detected location of idle left thumb 350, with prediction candidates "noise" and "note" displayed as the most likely candidates for selection. "Noise" and "note" are displayed first since idle left thumb 350 is detected on "e" input member 360. In some embodiments, word prediction candidates that have the highest weight may be displayed by device 100 with distinguishing visual indicia. As an example, in FIG. 3A, top prediction candidate "noise" is displayed in italics. In some embodiments, the character or characters associated with the non-typing digit position data may be displayed by device 100 with distinguishing visual indicia to indicate to the user a shortcut for selecting that particular candidate. In FIG. 3A, the character in each of the word prediction candidates in candidate ribbon 390 that is proximal to idle left thumb 350 is underlined. In other embodiments, device 100 may provide other visual indicia for the "non-typing digit" character, such as displaying the character in a different color, displaying the character in a different font, displaying the character in a different size font, etc.

In FIG. 3B, keyboard 220 receives input of the character "n" from right thumb 375 on input member 385, and displays the character to the left of cursor 240. In this example, left thumb 355 is resting on input member 365, which corresponds to the letter "s." Based on this position information, various prediction candidates are again displayed in candidate ribbon 395. As compared to FIG. 3A, the candidates in FIG. 3B are displayed in candidate ribbon 395 in a different order, due to non-typing left thumb 355 being detected in a different position on keyboard 220 than non-typing left thumb 350. In this example, "noise" is the top prediction candidate rather than "none," and as such, it is displayed at the far left of candidate ribbon 395 and in italics.

Figure 4:
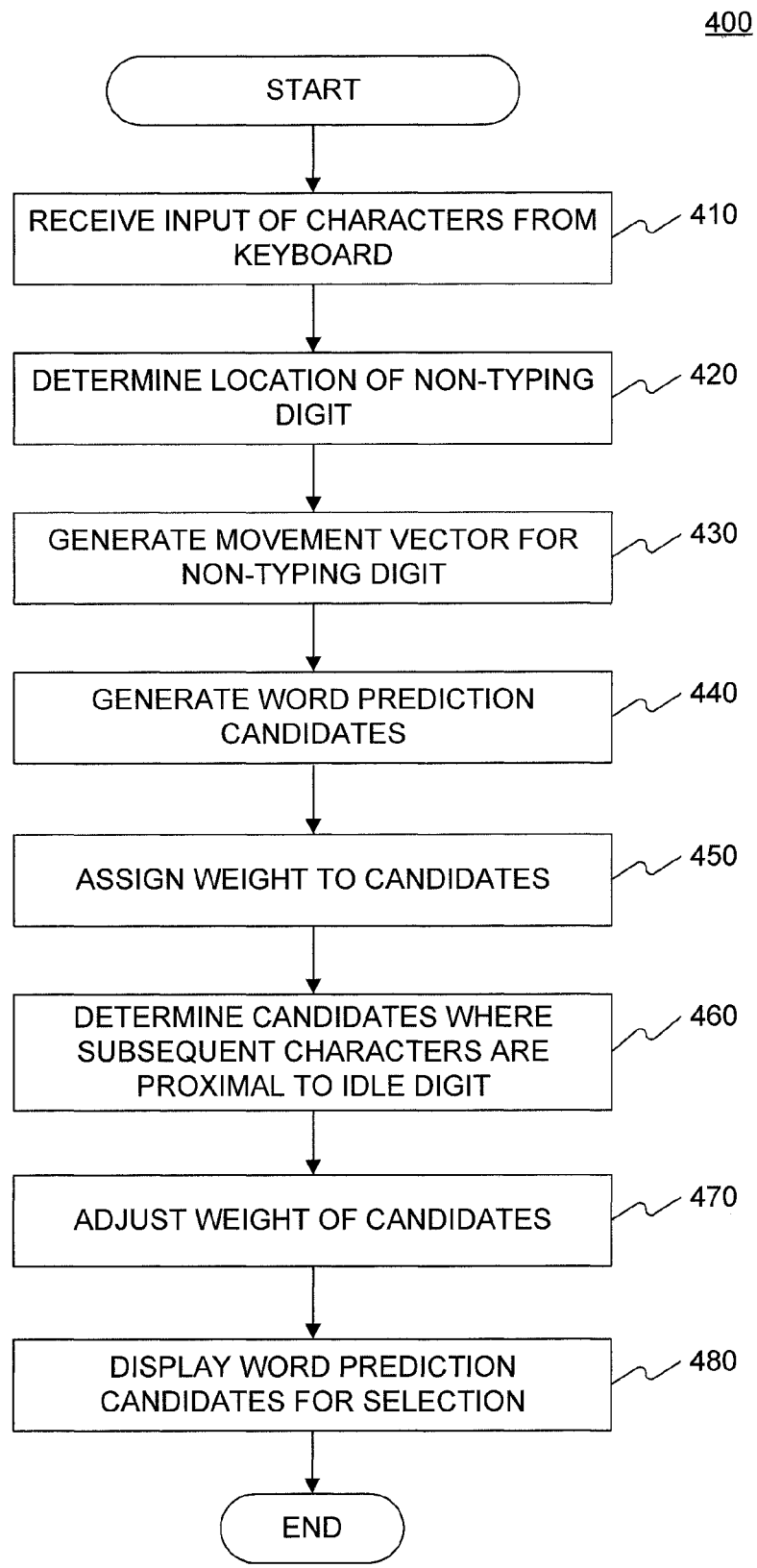
FIG. 4 is a flow chart showing an example word prediction process, consistent with embodiments disclosed herein.

FIG. 4 is a flow chart showing an example word prediction process 400. Electronic device 100 receives text input via keyboard 220 by a first digit of a plurality of characters (Step 410). Using information from keyboard 220 and capacitive sensors 122, device 100 detects the location of a second, non-typing digit (Step 420). Additionally, keyboard 220 and capacitive sensors 122 may detect a position of the non-typing digit at the end of multiple time points. From these time points, the motion of the non-typing digit can be measured from an origination point to a particular input member of keyboard 220 serving as a destination. Using this motion information, device 100 may generate a movement vector for the non-typing digit (Step 430).

Electronic device 100 generates a set of word prediction candidates based on characters input by the typing digit, and further based on the detected position and motion information for the non-typing digit (Step 440). The set of word prediction candidates may be generated based on prior inputs by the user, sentence context, or other known means. Electronic device 100 biases or weights the word prediction candidates in the set based on various probabilities and predetermined criteria (Step 450). In one embodiment, a word prediction candidate may have a higher probability of selection based on prior usage of the word by the user. In one embodiment, a word prediction candidate may alternatively have a higher probability of selection based on context clues within the typing task. In one embodiment, a word prediction candidate may alternatively have a higher probability of selection based on historical usage by other users of the language.

Based on the position and motion data of the non-typing digit, processor 102 determines the word prediction candidates which possess subsequent characters corresponding to input members of keyboard 220 proximal to the detected position of the non-typing digit (Step 460). As used herein, "proximal" in the context of keyboard 220 means within a distance of one input member in all directions. Processor 102 adjusts the weighting or bias within the set of word prediction candidates to enhance the likelihood that one or more of the select candidates which possess subsequent characters corresponding to input members of keyboard 220 proximal to the detected position of the non-typing digit are presented to the user for selection (Step 470). In some embodiments, the weight of candidates which possess subsequent characters corresponding to input members of keyboard 220 proximal to the detected position of the non-typing digit may be increased. In other embodiments, the weight of characters who do not possess such characters may be decreased. In some embodiments, word prediction candidates in which the next character is the same as the input member on which the non-typing digit is resting may be given the highest weight, followed by candidates with subsequent characters the same as the input member on which the non-typing digit is resting, etc.

Word prediction process 400 proceeds with processor 102 generating a set of select word prediction candidates based on the results of the weighting process. Those candidates are then displayed on display 112 for selection (Step 480). The candidates may be displayed by various methods and in various places on display 112 and touchscreen 118. The candidates may be displayed proximal to cursor 240 in a ribbon such as candidate ribbon 290 displayed in FIG. 2A. Alternatively, candidates may be presented in the lower half of display 112 and touchscreen 118 proximal to keyboard 220. Device 100 may receive selection of a word prediction candidate via keyboard 220 or touchscreen 118 and display the selected prediction candidate within viewing pane 230 to the left of cursor 240. Candidates may be selected via a key press input on keyboard 220 by the non-typing digit, or alternatively may be selected by a tap input. In alternative embodiments, the candidate may be selected by the typing digit.

Figure 5G:
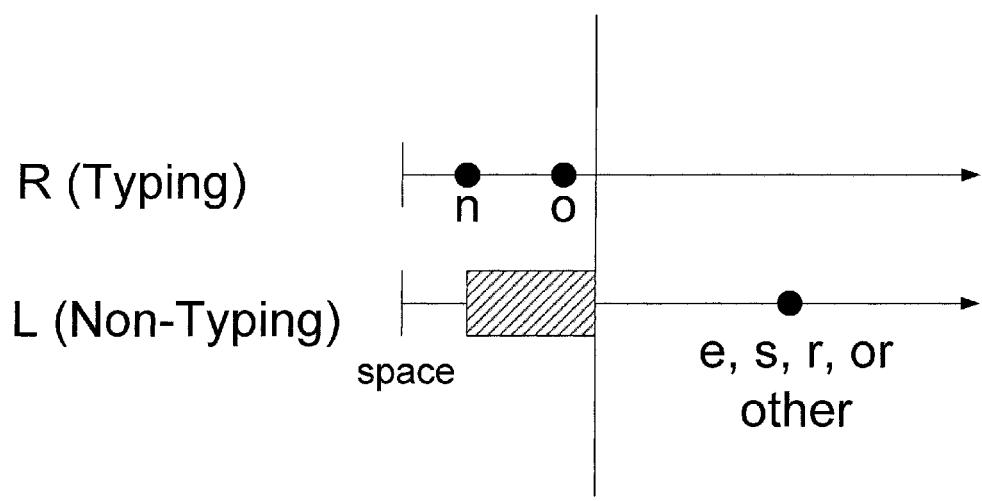

FIGS. 5A-5G provide further illustration of the word prediction process. In the example illustrated in FIG. 5A, device 100 is about to perform Step 420 of word prediction process 400. As can be further seen in FIG. 5B, keyboard 220 has received input of the characters "n" and "o" from the typing digit. Processor 102 generates an initial set of word prediction candidates based on the received characters "n" and "o" and other predetermined criteria. In FIG. 5B, device 100, via capacitive sensors 122, detects the position of the non-typing digit at the left side of space bar 510. The arrows 520 in FIG. 5B indicate "perfect" motion vectors that would represent movement of the non-typing digit to input members "a," "s," "e," and "r," respectively, of keyboard 220.

In Step 430 of word prediction process 400, the actual motion vector of the non-typing digit is calculated. As illustrated in FIG. 5C, the "actual" motion vector can be compared to "perfect" motion vectors for the various input members of keyboard 220 to predict movement and possible word prediction candidates. FIG. 5D is an illustration of Steps 450-470 of word prediction process 400 based on the detected motion of the non-typing digit shown in FIG. 5C. After giving initial weight to word prediction candidates (such as that illustrated in FIG. 5A), processor 102 receives the detected position and motion information of the non-typing digit from keyboard 220 and capacitive sensors 122, then adjusts the weighting of the prediction candidates based on the information. In the example illustrated in FIGS. 5C-5D, the closest input member to the actual detected motion vector of the non-typing digit is the "e" input member. Therefore, processor 102 adjusts the weight of prediction candidates who have a subsequent character of "e." As shown in FIG. 5D, processor 102 increases the weight of the prediction candidate "none," from 60 to 96, based on the detected position and motion information of the non-typing digit. Therefore, "none" becomes the most likely prediction candidate. Smaller probabilities were assigned in FIG. 5D for the input members "r" and "s," and thus processor 102 increases the weight of prediction candidates having those characters as subsequent characters, but by a smaller amount. In some embodiments, processor 102 may adjust weights of prediction candidates by differing amounts based on where a character proximal to the non-typing digit is within the candidate. For example, a prediction candidate whose next character is the character proximal to the non-typing digit may have its weight adjusted by a higher magnitude than a candidate that contains that character, but later in the word.

FIGS. 5E-5F illustrate further examples of word prediction process 400. In FIG. 5E, the actual motion vector for the non-typing digit measured in Step 430 is found to be closest to a path to the "s" input member of keyboard 220. Thus, in FIG. 5F, processor 102 adjusts candidates with later character "s" the most, followed by candidates with later characters "e" and "a," which were determined to have lower probabilities based on the detected motion vector. In the example of FIG. 5F, the top candidate remains "north," despite not having a later character of "s," "e," or "a." In this example, processor 102 may have other reasons to have "north" rated higher than candidates such as "noise" or "note," such as sentence context, prior usage by the user, etc.

Though depicted in FIGS. 5C and 5E as straight lines, the actual motion vectors detected and generated by device 100 and keyboard 220 may not be straight lines. In some embodiments, the vectors may be curved. Alternatively, the vectors may be interrupted, or may represent wandering paths of the non-typing digit.

FIG. 5G illustrates a further schematic for word prediction process 400, and corresponds to FIGS. 5C-5D. The top line represents the typing digit, which in this example is the right thumb, and the bottom line represents the non-typing digit, which in this example is the left thumb. At the beginning of the scenario depicted in FIGS. 5C-5D, the typing digit enters the characters "n" and "o" while the non-typing digit is detected on the left side of spacebar 510. The shaded box represents the measurement detection period for the position and motion of the non-typing digit. The vertical line represents the end of the measurement detection period, which essentially serves as a snapshot of the non-typing digit's position. After that point, the process described above in relation to Steps 450-470 of word prediction process 400 takes place, based on the information gathered to the left of the vertical line in FIG. 5G. Device 100 receives input from the non-typing digit after some passage of time, and it may be on the "e" input member, which is the most likely based on the detected position, the "r" input member, which is next most likely, the "s" input member, or some other input member.

Embodiments and all of the functional operations described in this specification can be implemented in digital electronic circuitry, or in computer software, firmware, or hardware, including the structures disclosed in this specification and their structural equivalents, or in combinations of them. Embodiments can be implemented as one or more computer program products, i.e., one or more modules of computer program instructions encoded on a computer readable medium, e.g., a machine readable storage device, a machine readable storage medium, a memory device, or a machine readable propagated signal, for execution by, or to control the operation of, data processing apparatus.

The terms "electronic device" and "data processing apparatus" encompass all apparatuses, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of them. A propagated signal is an artificially generated signal, e.g., a machine-generated electrical, optical, or electromagnetic signal, which is generated to encode information for transmission to suitable receiver apparatus.

A computer program (also referred to as a program, software, an application, a software application, a script, or code) can be written in any form of programming language, including compiled or interpreted languages, and it can be deployed in any form, including as a stand-alone program or as a module, component, subroutine, non-transitory form, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this specification (e.g., FIG. 4) can be performed by one or more programmable processors executing one or more computer programs to perform functions by operating on input data and generating output. The processes and logic flows can also be performed by, and apparatuses can also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for executing instructions and one or more memory devices for storing instructions and data. Generally, a computer will also include, or be operatively coupled to, a communication interface to receive data from or transfer data to, or both, one or more mass storage devices for storing data, e.g., magnetic, magneto optical disks, or optical disks.

Moreover, a computer can be embedded in another device. Information carriers suitable for embodying computer program instructions and data include all forms of non-volatile memory, including by way of example semiconductor memory devices, e.g., EPROM, EEPROM, and flash memory devices; magnetic disks, e.g., internal hard disks or removable disks; magneto optical disks; and CD ROM and DVD ROM disks. The processor and the memory can be supplemented by, or incorporated in, special purpose logic circuitry.

To provide for interaction with a user, embodiments of the invention can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

Embodiments can be implemented in a computing system that includes a back end component, e.g., as a data server, or that includes a middleware component, e.g., an application server, or that includes a front end component, e.g., a client computer having a graphical user interface or a Web browser through which a user can interact with an implementation of the invention, or any combination of such back end, middleware, or front end components. The components of the system can be interconnected by any form or medium of digital data communication, e.g., a communication network. Examples of communication networks include a local area network ("LAN") and a wide area network ("WAN"), e.g., the Internet.

Certain features which, for clarity, are described in this specification in the context of separate embodiments, may also be provided in combination in a single embodiment. Conversely, various features which, for brevity, are described in the context of a single embodiment, may also be provided in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Particular embodiments have been described. Other embodiments are within the scope of the following claims.

What is claimed is:

1. A method for operating an electronic device having a display and a keyboard having a plurality of input members for receiving inputs, comprising:
   receiving an input of one or more characters by a first typing digit;
   detecting a first position of a non-typing digit while receiving the input by the first typing digit, wherein the non-typing digit is a digit other than the typing digit;
   determining a plurality of reference motion vectors that represent respective possible movements of the non-typing digit from the first position of the non-typing digit to a plurality of possible input members of the keyboard;

detecting a second position of the non-typing digit at the end of multiple time points;
generating an actual motion vector for the non-typing digit based on the first position and the second position of the non-typing digit;
comparing the actual motion vector with the plurality of reference motion vectors;
generating a set of word prediction candidates based on the input and the second position of the non-typing digit;
weighting the word prediction candidates in the set;
adjusting weights for word prediction candidates based on respective closeness between the actual motion vector with the plurality of reference motion vectors; and
displaying select ones of the word prediction candidates based on the adjusted weights.

2. The method of claim 1, further comprising:
receiving selection of a word prediction candidate; and
responsive to detection of an input reflecting selection of one of the word prediction candidates, displaying in an input field on the display the selected candidate.

3. The method of claim 1, further comprising:
displaying visual indicia of the character within each displayed word prediction candidate corresponding to the input member proximal to the detected position of the non-typing digit.

4. The method of claim 1, wherein weighting the word prediction candidates in the set includes weighting the word prediction candidates based on a geographical location of a user.

5. The method of claim 1, wherein adjusting weights for word prediction candidates includes:
weighting word prediction candidates in which a next character corresponds to an input member located under the non-typing digit greater than word prediction candidates in which a character following the next character corresponds to the input member located under the non-typing digit.

6. The method of claim 1, wherein detecting the first position of the non-typing digit comprises:
detecting one or more X-Y coordinate pairs associated with the non-typing digit;
selecting one of the coordinate pairs; and
selecting an input member associated with the selected coordinate pair.

7. The method of claim 1, wherein the non-typing digit is hovering above the keyboard and its position is sensed by capacitive sensors integrated with, situated above, or situated under the input members.

8. The method of claim 1, wherein:
the input of one or more characters by the first typing digit corresponds to input members located to a first side of a space bar input member on the keyboard; and
the position of the non-typing digit corresponds to an input member located to a second side of the space bar input member, the first side and the second side being on opposite sides of the space bar input member.

9. The method of claim 1, wherein: determining a plurality of reference motion vectors that represent respective possible movements of the non-typing digit from the first position of the non-typing digit to a plurality of possible input members of the keyboard the plurality of possible input members of the keyboard comprises determining a plurality of reference motion vectors that represent respective possible movements of the non-typing digit from the first position of the non-typing digit to a plurality of input members that are within a distance of the first position of the non-typing digit in all directions of the keyboard.

10. An electronic device having a display and a keyboard having a plurality of input members for receiving inputs, comprising:
a memory containing instructions; and
one or more processors configured to execute the instructions to:
receive an input of one or more characters by a first typing digit;
detect a first position of a non-typing digit while receiving the input by the first typing digit, wherein the non-typing digit is a digit other than the first digit;
determine a plurality of reference motion vectors that represent respective possible movements of the non-typing digit from the first position of the non-typing digit to a plurality of possible input members of the keyboard;
detect a second position of the non-typing digit at the end of multiple time points;
generate an actual motion vector for the non-typing digit based on the first position and the second position of the non-typing digit;
compare the actual motion vector with the plurality of reference motion vectors;
generate a set of word prediction candidates based on the input and the second position of the non-typing digit;
weight the word prediction candidates in the set;
adjust weights for word prediction candidates based on respective closeness between the actual motion vector with the plurality of reference motion vectors; and
display select ones of the word prediction candidates based on the adjusted weights.

11. The electronic device of claim 10, wherein the one or more processors are further configured to execute the instructions to:
receive selection of a word prediction candidate; and
responsive to detection of an input reflecting selection of one of the word prediction candidates, display in an input field on the display the selected candidate.

12. The electronic device of claim 10, wherein the one or more processors are further configured to execute the instructions to:
display visual indicia of the character within each displayed word prediction candidate corresponding to the input member proximal to the detected position of the non-typing digit.

13. The electronic device of claim 10, wherein the one or more processors are further configured to execute the instructions to:
weight the word prediction candidates based on a geographical location of a user.

14. The electronic device of claim 10, wherein the one or more processors are further configured to execute the instructions to:
adjust weights for word prediction candidates by weighting word prediction candidates in which a next character corresponds to an input member located under the non-typing digit greater than word prediction candidates in which a character following the next character corresponds to the input member located under the non-typing digit.

15. The electronic device of claim 10, wherein the one or more processors are further configured to execute the instructions to:
detect the position of the non-typing digit by:
detecting one or more X-Y coordinate pairs associated with the non-typing digit;
selecting one of the coordinate pairs; and selecting an input member associated with the selected coordinate pair.

16. The electronic device of claim 10, wherein the non-typing digit is hovering above the keyboard and its position is sensed by capacitive sensors integrated with, situated above, or situated under the input members.

17. The electronic device of claim 10: wherein:
the input of one or more characters by the first typing digit corresponds to input members located to a first side of a space bar input member on the keyboard; and
the position of the non-typing digit corresponds to an input member located to a second side of the space bar input member, the first side and the second side being on opposite sides of the space bar input member.

18. The electronic device of claim 10, wherein the one or more processors are configured to execute the instructions to:
determine a plurality of reference motion vectors that represent respective possible movements of the non-typing digit from the first position of the non-typing digit to a plurality of input members that are within a distance of the first position of the non-typing digit in all directions of the keyboard.

* * * * *